United States Patent [19]
Fouts

[11] 3,752,506
[45] Aug. 14, 1973

[54] SEALED FITTING FOR REINFORCED HOSE
[76] Inventor: Robert E. Fouts, 14611 Hawthorne Blvd., Lawndale, Calif. 90260
[22] Filed: Sept. 18, 1972
[21] Appl. No.: 289,793

[52] U.S. Cl. ............................. 285/149, 285/179
[51] Int. Cl. ............................................ F16l 39/02
[58] Field of Search............... 285/149, 250, 249, 285/248, 247, 179

[56] References Cited
UNITED STATES PATENTS

| 2,833,567 | 5/1958 | Bacher et al. | 285/149 X |
| 3,140,106 | 7/1964 | Thomas et al. | 285/149 |
| 2,797,474 | 7/1957 | Main | 285/149 X |
| 2,731,279 | 1/1956 | Main | 285/149 X |

Primary Examiner—Thomas F. Callaghan
Attorney—C. A. Miketta, Larry A. Jackson et al.

[57] ABSTRACT

A fitting assembly for use with a hose having an inner fluid sealing tube and an outer tubular reinforcement, the fitting assembly being of the so-called lip-seal, detachable and reusable type. The fitting assembly includes a nipple, the forward end portion of which may be inserted into the hose inner tube, a sleeve which is concentrically positioned about the nipple so as to define an annular space therewith in which a portion of the inner tube of the hose is forced during assembly, and a socket which is threadably received on the sleeve and which defines a second annular space between the sleeve and the internal surface of the socket, the socket also including means for gripping the end of the hose during assembly so that axial movement of the socket relative to the sleeve forces a portion of the hose inner tube and the outer reinforcement into the second annular space. When fully assembled, the nipple may be rotated relative to the sleeve, hose, and socket so that if the nipple is attached to an albow connection and the opposite end of the hose cannot be rotated, the elbow may be rotated without affecting the seal. The embodiments disclosed are particularly adapted for use with types of hose, such as Mil. Spec. H 58089, which are relatively flexible.

6 Claims, 6 Drawing Figures

3,752,506

SEALED FITTING FOR REINFORCED HOSE

PRIOR ART AND BACKGROUND

There are numerous hose and fitting assemblies described in the prior art, many of which are of the lip-seal detachable, reusable type as is the fitting assembly of the present invention. While many of such prior art devices disclose effective hose fitting assemblies which provide a good sealing relation between the hose end and the fitting, most of such devices are adapted for connection of two fluid connecting members which are in general alignment. In other words, where the hose fitting assembly is of the elbow type, the sealing relationship established when the fitting is assembled to the hose may be destroyed if the nipple is rotated relative to the hose after assembly.

One attempt to overcome the problem of degradation of the sealing relationship between the hose and the nipple after the fitting is assembled to the hose, which is presently known, is the device disclosed in U.S. Pat. No. 3,055,682. While such device is specifically adapted to maintain a seal notwithstanding that the nipple is attached to an elbow connection which is desirably rotated after assembly of the hose to the fitting, it is adapted to a hose construction having an inner tube which is of relatively stiff and inelastic material such as Teflon Although the specific construction disclosed in such patent may be well-adapted for Teflon hose, it is not believed to be suitable, or advantageous, for a hose material which is more elastic, flexible and deformable, such as rubber, neoprene, butadiene or similar type hose materials.

Moreover, while the prior art devices generally referred to above have performed satisfactorily in some uses, there are certain disadvantages to these devices which are overcome by the present invention.

SUMMARY OF THE INVENTION:

It is therefore a general object of the present invention to provide a hose end fitting which overcomes the disadvantages of the prior art devices and which is inexpensive to manufacture, reliable in operation, and is simple to use and install. The fitting is particularly adaptable for use with a reinforced hose having an inner tube that is flexible and elastic, such as Mil. Spec. H 58089. It is a particular object of the present invention to provide an end fitting in which the nipple that is normally inserted into the inner hose tube is fixedly attached to an elbow connection but permits the elbow to be rotated after the assembly is completed without damaging the seal.

Generally, the present invention provides a hose and end fitting assembly wherein the hose comprises an inner fluid sealing tube and an outer tubular reinforcement and where the fitting assembly is of the lip-seal, detachable and reusable type and includes a nipple having an elongated substantially cylindrical portion received in the fluid sealing tube, an integral enlarged diameter substantially cylindrical portion, and a shoulder portion joining the cylindrical portions, the enlarged portion outer surface having an annular O-ring recess therein axially adjacent the shoulder and an annular connector wire recess also on the surface thereof and spaced axially away from the shoulder, a swivel adapter including a substantially cylindrical sleeve portion with an inner diameter greater than the outer diameter of the nipple elongated cylindrical portion so as to define an annular space therebetween for receiving at least a portion of the lip-seal portion of the hose inner tube, the sleeve having external threads, the adapter including a nut portion with an inner generally uniform diameter greater than the inner diameter of the sleeve portion so as to define an internal annular shoulder, the inner diameter of the nut portion being only slightly larger than the external diameter of the enlarged portion of the nipple for receiving the enlarged portion in snug relation, the inner surface of the nut portion having an annular connector wire recess therein, a wire connector disposed in said annular wire recesses when in registry to prevent relative axial movement between the adapter and nipple but permitting relative rotation therebetween, an O-ring disposed in the O-ring recess, and a socket receiving the adapter sleeve portion and the nipple elongated cylindrical portion, the socket having an internally threaded section adjacent one end for threaded engagement with the adapter, an intermediate section having a diameter greater than the external diameter of the adapter sleeve portion so as to define a second annular space receiving the hose outer tubular reinforcement and a portion of the hose inner tubing, and a remaining section having an axially rearwardly decreasing diameter and means for gripping the reinforcement when the socket is axially advanced by threaded engagement with the sleeve thereby forcing a portion of the hose inner tube into the first annular space between the sleeve and nipple and forcing a second portion of the inner tube and the reinforcement into the second annular space between the sleeve and the socket.

Figure 1:
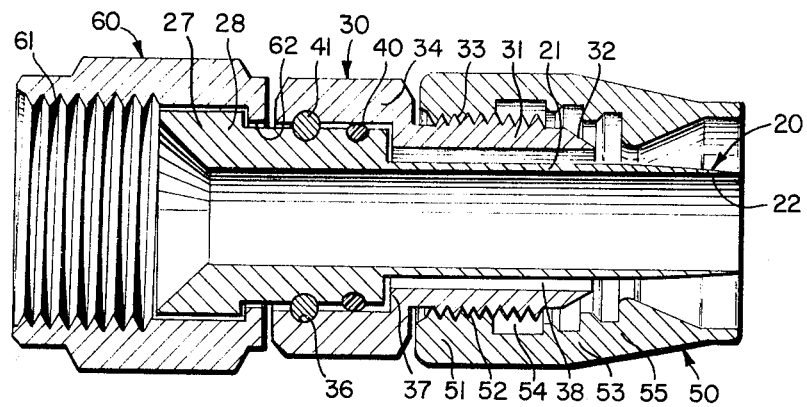
FIG. 1 is an exemplary embodiment of a straight sealed fitting for reinforced hose with a female end fitting constructed in accordance with the present invention.
Figure 2:
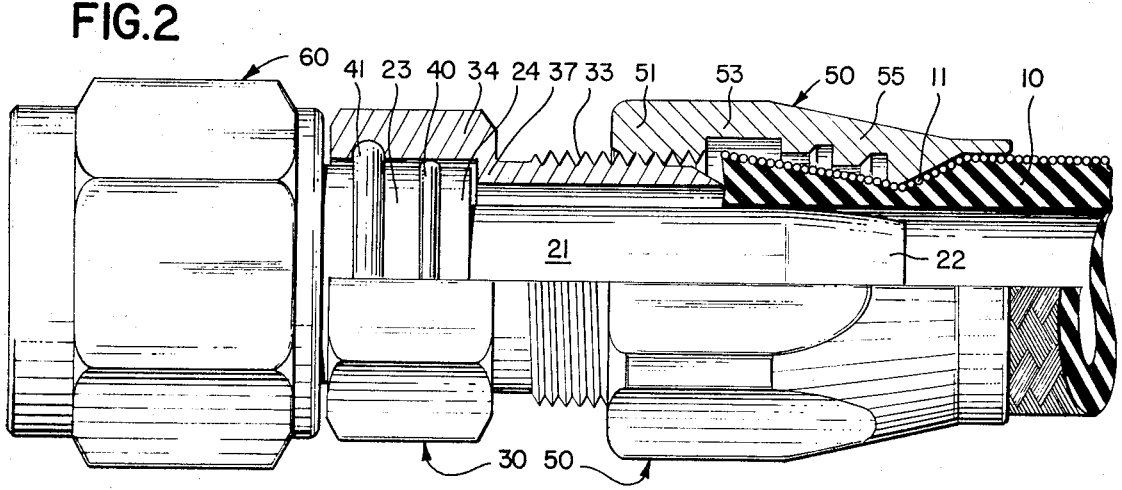
FIG. 2 is a partial sectional view showing the commencement of the engagement of the reinforced hose with the fitting shown in FIG. 1.
Figure 3:
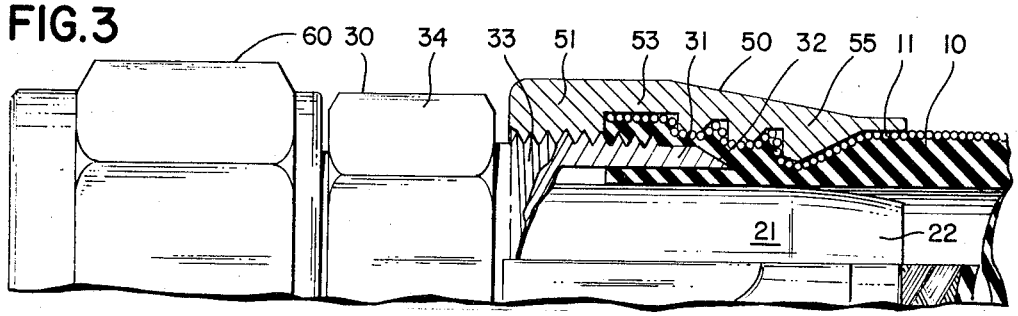
FIG. 3 is a partial sectional view as in FIG. 2 showing the fitting completely assembled.

DETAILED DESCRIPTION OF THE PREFERRED EMBODIMENTS:

Turning now to FIG. 1, there is shown a sealed fitting for reinforced hose commonly referred to as a fitting assembly of the lip-seal, detachable, reusable type. The fitting assembly is adapted for use with reinforced hose which, as seen in FIGS. 2 and 3, comprises an inner fluid sealing tube 10 of rubber or elastomeric or similar material and an outer tubular reinforcement 11 of conventional wire braided construction. Referring now to the straight fitting assembly illustrated in FIGS. 1 through 3, the fitting assembly comprises a nipple indicated generally at 20 of generally cylindrical construction and including an elongated substantially cylindrical portion 21 having a smooth forward edge 22 for reasons to be more fully explained hereinafter. The nipple further comprises an integral enlarged portion 23 having an outside diameter greater than the outside diameter of the elongated cylindrical portion 21 with the same internal diameter. The enlarged diameter substantially cylindrical portion 23 joins the lesser diameter portion 22 to form an external shoulder portion 24. Axially spaced from shoulder portion 24 the exterior surface of the enlarged portion 23 is provided with an annular O-ring recess 25. Further axially spaced away from the shoulder portion 24 a second annular recess 26 is formed in the surface of the enlarged portion 23 of the nipple 20 for receiving a connector wire.

Concentrically disposed over the nipple 20 is a swivel adapter indicated generally at 30 and comprising a substantially cylindrical sleeve portion 31 having a sharp forward edge 32. The sleeve portion 31 has an internal diameter which is greater than the external diameter of the elongated cylindrical portion 21 of nipple 20. On the exterior surface of the substantially cylindrical sleeve portion 31 there are formed external threads 33.

The swivel adapter 30 also includes a nut portion 34 of conventional hexogonal construction with an interior surface having an annular connector wire inwardly facing recess 36. The internal diameter of the nut portion 34 is greater than the internal diameter of the sleeve portion 31 so that there is formed an internal shoulder 37 at the juncture of the nut portion and the sleeve portion. As seen best in FIG. 1, the sleeve adapter 30 is positioned over the nipple 20 so as to form an annular space 38 between the inner surface of the sleeve portion 31 of adapter 30 and the exterior surface of the elongated cylindrical portion 21 of nipple 20.

When assembled, an O-ring 40 is positioned on the annular recess 25 of the nipple 20 and the swivel adapter 30 is then positioned as shown in FIG. 1 and a wire connector 41 is inserted through a suitable opening in the exterior surface of nut portion 34 of adpater 30 in a manner well known in the art thereby axially securing the swivel adapter 30 to the nipple 20 while permitting the adapter to be rotated relative to the nipple.

The assembly also comprises a socket indicated generally at 50 having a forward internally threaded section 51 including threads 52 for mating engagement with the external threads 33 of swivel adapter 30. The exterior of the forward internally threaded section 51 forms a conventional hexagonal nut so that the socket may be tightened relative to the swivel adapter. The socket further includes an intermediate section 53 which, when the socket is threaded onto the swivel adapter as shown in FIG. 1, defines an annular space 54 between the exterior surface of the sleeve portion 31 of adapter 30 and the internal surface of the socket portion 53. Finally, the socket includes an axially rearwardly decreasing diameter section 55 which includes means 56 for gripping the outer tubular reinforcement of the hose, in a manner well known in the art. Further rearwardly of the gripping means the internal diameter of the socket is again increased to a diameter which will accommodate the hose with which the fitting assembly is to be used.

Referring now to FIGS. 2 and 3, it will be seen that the fitting is assembled by first placing the socket 50 over the end of the hose so that the forward edge of the hose extends into the intermediate portion 54 of the socket at which time the socket and hose is ready to be mated with the nipple and swivel adapter. As seen best in FIG. 2, during assembly, the smaller diameter elongated cylindrical portion 21 of the nipple 20 is inserted into the hose inner tube 10 and the external diameter of the nipple portion 21 is only slightly larger than the internal diameter of the inner tube 10 so that the nipple may be freely but snugly forced into the hose. As the threads of the socket 50 begin to engage the external threads 33 of the swivel adapter, the sharpened forward edge 32 of the swivel adapter engages the forward face of the inner tube 10 of the hose as seen in FIG. 2. When the sleeve adapter 30 is rotated relative to the socket 50 during threading engagement the rotational motion of the forward edge 32 of the swivel adapter will cut into the forward face of the hose lip so as to form an inner and outer flap as seen best in FIG. 3. The inner flap completely fills the annular space 38 and the outer flap together with the outer tubular reinforcement 11 is forced radially outwardly into the intermediate portion 54 of the socket 50 as well as into the grooves which constitute the means for gripping the hose. It will now be apparent that a lip seal is formed along the engaging faces of the outer surface of the nipple portion 21 and the inner face of the inner tube 10 which forms the primary seal. Any fluid which may pass such seal is retained by the fitting assembly by virtue of the O-ring 40 which provides a second or supplementary seal at one end of the fitting assembly and of course both the inner and outer surfaces of the sleeve portion 31 of the adapter 30 are in engagement with the inner and outer flaps cut into the lip of the hose 10 to provide a second seal at the opposite end of the fitting.

In the first exemplary embodiment shown in FIGS. 1 through 3 wherein a straight fitting assembly is shown the nipple 20 is provided at its rearward end with a further enlarged integral portion 27 having an internal diameter equal to the internal diameter of the remainder of the nipple and having an outwardly flared opening at its rearward end. The further enlarged diameter portion 27 joins the enlarged diameter portion 23 so as to form an external shoulder 28. A female coupling member 60 completes the fitting assembly and, in the exemplary embodiment shown in FIGS. 1 through 3, comprises a member having a conventional hexagonal outer surface with internal threads 61 adapted to be matingly engaged to a male threaded connection. Internally, at the forward end of the member 60 the internal diameter is slightly larger than the external diameter of the further enlarged portion 27 of nipple 20 and at its forwardmost end the member has an opening 62 with a diameter slightly larger than the enlarged portion 23 of nipple 20 so that an internal shoulder is formed which will matingly engage with the external shoulder 28 of the nipple. Such construction is entirely conventional and well known in the art.

Figure 4:
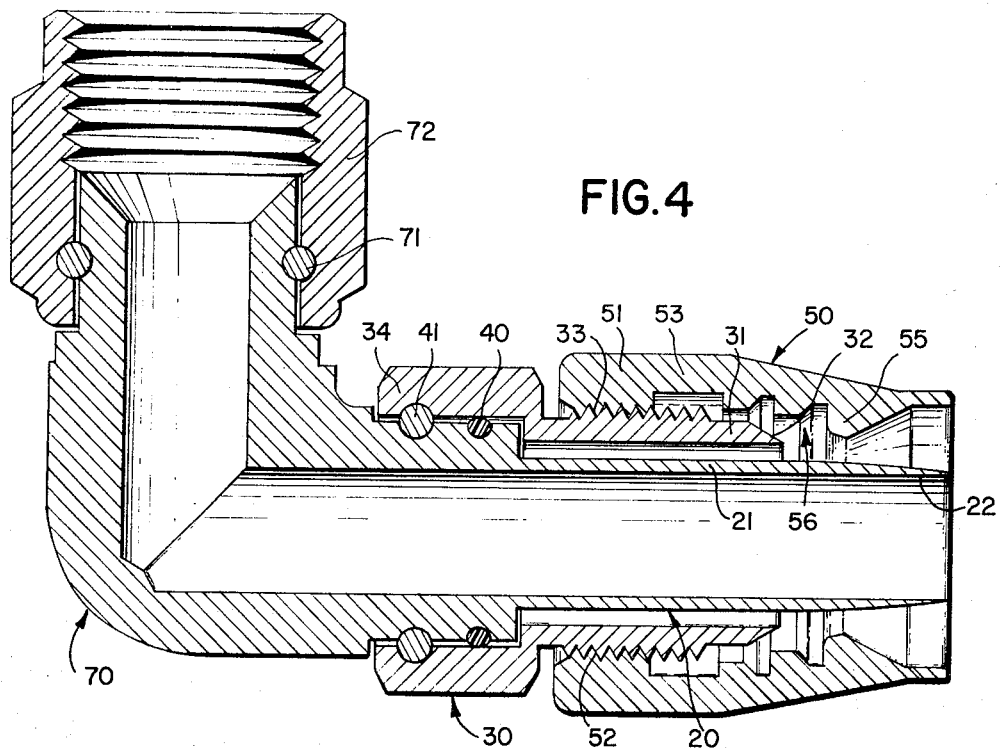
FIG. 4 is a second exemplary embodiment of a fitting assembly with the nipple attached to a forged elbow connection.

Turning now to FIG. 4, there is a second exemplary embodiment of the invention shown which includes the nipple 20, swivel adapter 30, and socket 50 which are constructed and cooperate in the same manner as disclosed in the first exemplary embodiment. In the embodiment shown in FIG. 4, the nipple 20 is integral with a forged elbow connection, the body of which is shown generally at 70. The elbow body 70 has an internal diameter which is equal to the internal diameter of the nipple 20 and is of course bored at a right angle to the bore of the nipple 20. The exterior surface of the body 70 at the end opposite from the end which is connected to the nipple 20 may have, internally, a flared portion as described in reference to the first exemplary embodiment and externally may be provided with a recess for receiving a wire connector 71 that axially secures a female connecting member 72 to the elbow body permitting the female member 72 to be rotated relative to the body but axially is fixed in relation thereto.

Turning now to FIG. 5, again there is shown the identical elements as in the first exemplary embodiment which includes the nipple 20, swivel adapter 30, and socket 50. The construction of the embodiment shown in FIG. 5 differs from that shown in FIG. 4 since the nipple is integrally formed with an elbow connection 80. The elbow connection and nipple comprises a conventional piece of metal tubing which is bent into a right angle, one end of which forms the nipple while the other end is rotatably connected to a female coupling member 81. While the swivel adapter 30 and socket 50 are identical to those shown in the two previous exemplary embodiments, the nipple, due to the method of construction, differs. More specifically, prior to bending the tubing which forms the elbow connection and the nipple, the elongated substantially cylindrical portion 21 is formed by turning down the wall of the tubing to a lesser diameter so as to form a slightly enlarged portion 23a. To form the complete enlarged portion 23, it is necessary to increase the diameter of the portion 23a by positioning an annular band 23b over the nipple portion of the tubing so that one edge of the band is axially aligned with the shoulder formed where the enlarged portion 23a of the tubing joins the elongated portion 21. The annular band 23b is then brazed or otherwise permanently secured, as at 23c, to the portion 23a of the tubing so as to form the complete enlarged portion 23. Of course, the annular band 23b is provided on its exterior surface with the annular recesses 25, 26 for receiving the O-ring 40 and wire connector 41. It will therefore be apparent that a fitting assembly may be constructed by using a forged elbow connection as in FIG. 4 with subsequent machining or an ordinary conventional piece of tubing may be used suitably machined and brazed so as to have an annular band which forms the enlarged portion 23.

Figure 1A:
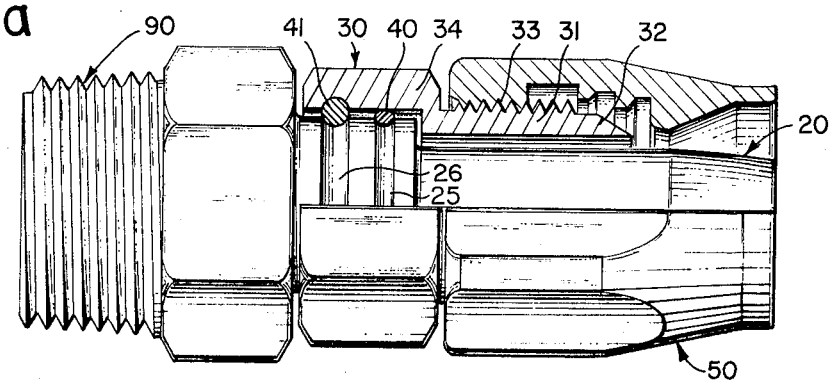
FIG. 1a is a partial sectional view of a straight sealed fitting for reinforced hose with a male end fitting integral with the nipple.

Referring to FIG. 1a, the straight fitting there shown is identical in all respects to the fitting shown in FIG. 1 except for the non-hose-connecting portion. Instead of the female member 60, which is rotatable relative to the nipple, the male end 90 is integral with the nipple 20 and thus rotates therewith.

Figure 5:
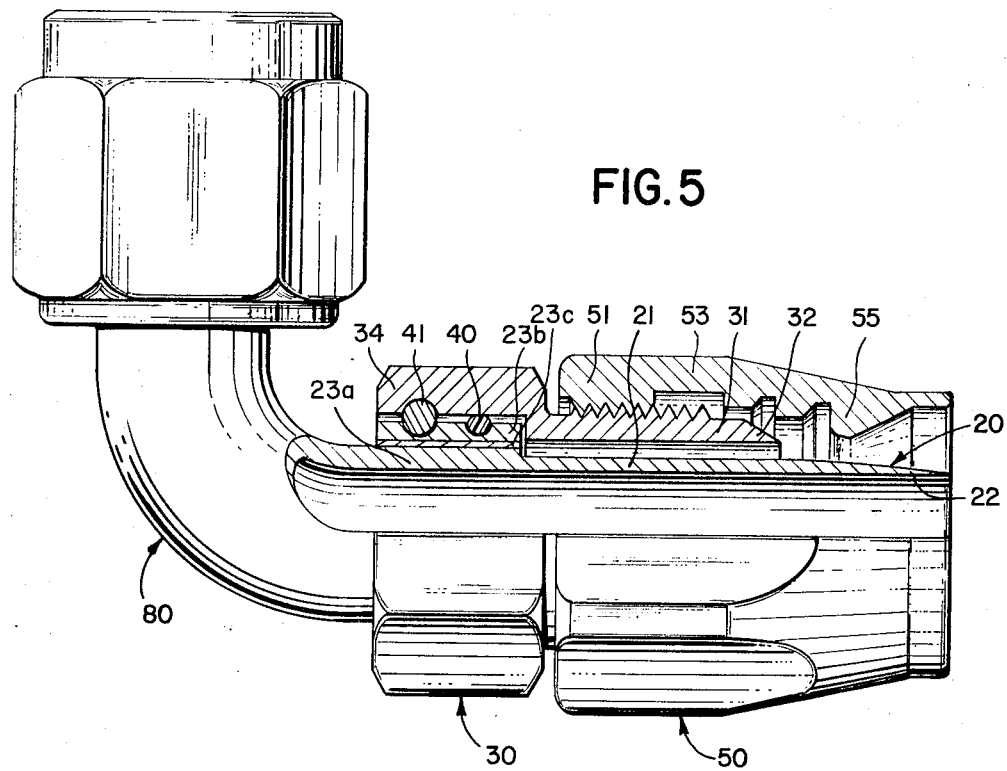
FIG. 5 is a third exemplary embodiment of a fitting with the nipple integral with a bent-tube elbow connection.

The advantage of the construction of the present invention is particularly apparent from the elbow connections shown in FIGS. 4 and 5, and the non-rotating end portion fitting shown in FIG. 1a. With conventional constructions, if an elbow connection is secured at each end of a hose and one end is secured, the free elbow end may not be properly aligned as required to be secured. The latter elbow connection must be rotated, therefore, but such rotation will break the seal between the nipple and the inner tube of the hose. On the other hand, with the present invention, one elbow connection when rotated relative to the other will break only the seal between the outer surface of the nipple portion 21 and the hose but not between the inner surface of the sleeve portion 31 of the swivel adapter 30 which also seals against the exterior surface of the inner flap of the hose as previously explained.

The male end fitting of FIG. 1a also permits rotation of the connecting portion of the fitting while only breaking one seal. Thus, the present invention when used with rotatable connection portions integral with the nipple is superior to presently available connections as commonly used on neoprene hose.

Of course, other modifications and variations of the present invention are possible as will be apparent to those having skill in the art without departing from the scope of the invention.

I claim:

1. A hose and fitting assembly, the hose having an inner fluid sealing tube and an outer tubular reinforcement, and the fitting assembly being of the lip-seal, detachable and reusable type comprising:

a nipple having an elongated substantially cylindrical portion received in the fluid sealing tube, an integral enlarged diameter substantially cylindrical portion, and a shoulder portion joining said cylindrical portions, said enlarged portion outer surface having an annular O-ring recess therein axially adjacent said shoulder and an annular connector wire recess also in the surface thereof spaced axially away from said shoulder, an integral swivel adapter including a substantially cylindrical sleeve portion with an inner diameter greater than the outer diameter of said nipple elongated cylindrical portion so as to define an annular space therebetween receiving at least a portion of the lip seal portion of said hose inner tube, said sleee having external threads and a forwardly extending portion having a sharp edge, said adapter including a nut portion with an inner generally uniform diameter greater than the inner diameter of said sleeve portion so as to define an internal annular shoulder, the inner diameter of said nut portion being only slightly larger than the external diameter of the enlarged portion of said nipple for receiving said enlarged portion in snug relation, the inner surface of said nut portion having an annular connector wire recess therein, a wire connector disposed in said annular wire recesses when in registry to prevent relative axial movement between said adapter and nipple while permitting relative rotation therebetween, an O-ring disposed in said O-ring recess, and a socket receiving said adapter sleeve portion and said nipple elongated cylindrical portion, said socket having an internally threaded section adjacent one end for threaded engagement with said adapter, an intermediate section having a diameter greater than the external diameter of said forwardly extending portion so as to define an annular space receiving said hose outer tubular reinforcement, and a remaining section having an axially rearwardly decreasing diameter and means for gripping said reinforcement when said socket is axially advanced by threaded engagement with said sleeve thereby forcing a portion of said hose inner tube into said annular space between said sleeve and nipple and forcing said other portion and said reinforcement into said annular space between said sleeve and said socket.

2. The hose and fitting assembly of claim 1 wherein said nipple is fixedly mounted to an elbow connection.

3. The hose and fitting assembly of claim 1 wherein said nipple has a further enlarged integral portion, and a second shoulder joining said enlarged and further enlarged portions, and additionally including a female coupling member having an internal diameter extending from one end greater than the external diameter of said nipple further enlarged portion and a reduced diameter opening at the opposite end, said reduced diameter being greater than the enlarged portion of said nipple and less than the further enlarged portion of said nipple so as to define an internal shoulder for engagement with said nipple second shoulder.

4. The hose and fitting assembly of claim 2 wherein said elbow and nipple are integral.

5. The hose and fitting assembly of claim 4 wherein said elbow and nipple elongated cylindrical portion have substantially the same external diameter and said nipple enlarged portion comprises an annular band received on said nipple and fixedly secured thereto.

6. The hose and fitting assembly of claim 1 wherein said nipple is fixedly mounted to a male end connecting portion.

* * * * *